United States Patent [19]

Mergl

[11] 4,269,298

[45] May 26, 1981

[54] TRAY INDEXING APPARATUS

[75] Inventor: Vernon F. Mergl, Timonium, Md.

[73] Assignee: National Instrument Co., Baltimore, Md.

[21] Appl. No.: 933,983

[22] Filed: Aug. 16, 1978

[51] Int. Cl.³ .............................................. B65G 43/00
[52] U.S. Cl. .................................. 198/341; 198/470; 198/743; 198/572; 53/67; 53/534; 141/168
[58] Field of Search ............... 198/341, 339, 345, 472, 198/743–745, 648, 610, 575, 577, 572, 857, 859, 460, 469, 470; 53/67, 534; 141/168

[56] References Cited

U.S. PATENT DOCUMENTS

| | | | |
|---|---|---|---|
| 3,310,150 | 3/1967 | Southard | 198/743 |
| 3,384,097 | 5/1968 | Meeker et al. | 198/339 |
| 3,816,972 | 6/1974 | Kemper | 53/534 |

FOREIGN PATENT DOCUMENTS 1157693  7/1969  United Kingdom ..................... 198/339

*Primary Examiner*—Joseph E. Valenza
*Attorney, Agent, or Firm*—Craig and Antonelli

[57] ABSTRACT

A tray indexing apparatus is disclosed for indexing trays containing rows of containers to be filled beneath a filler head. The apparatus includes means for supporting trays for movement along a predetermined path, means for indexing the supported trays beneath a filler head where the respective rows of containers are filled, and means for successively moving the supported trays along the predetermined path to a position for indexing by the indexing means and moving indexed, supported trays containing filled containers further along the predetermined path.

6 Claims, 7 Drawing Figures

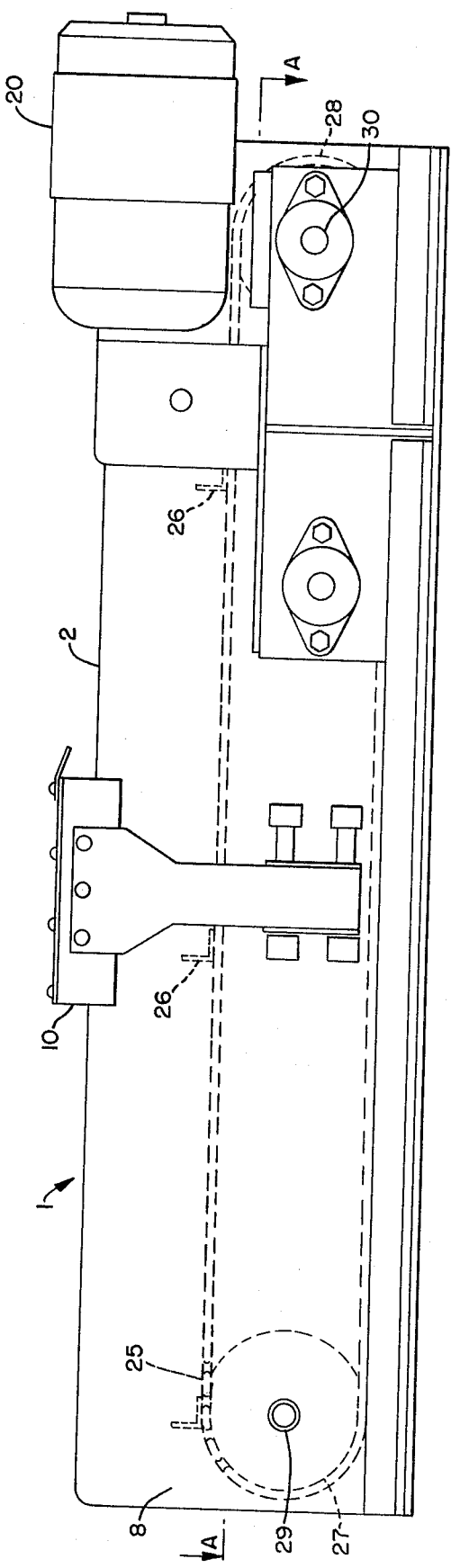
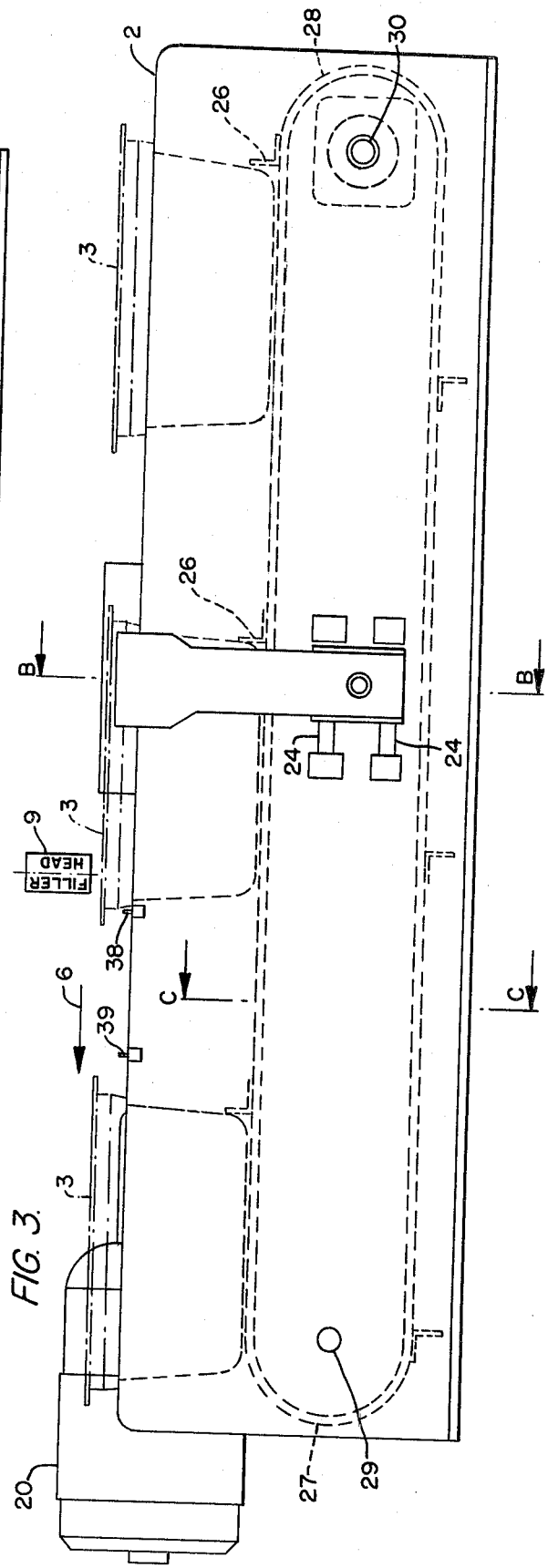

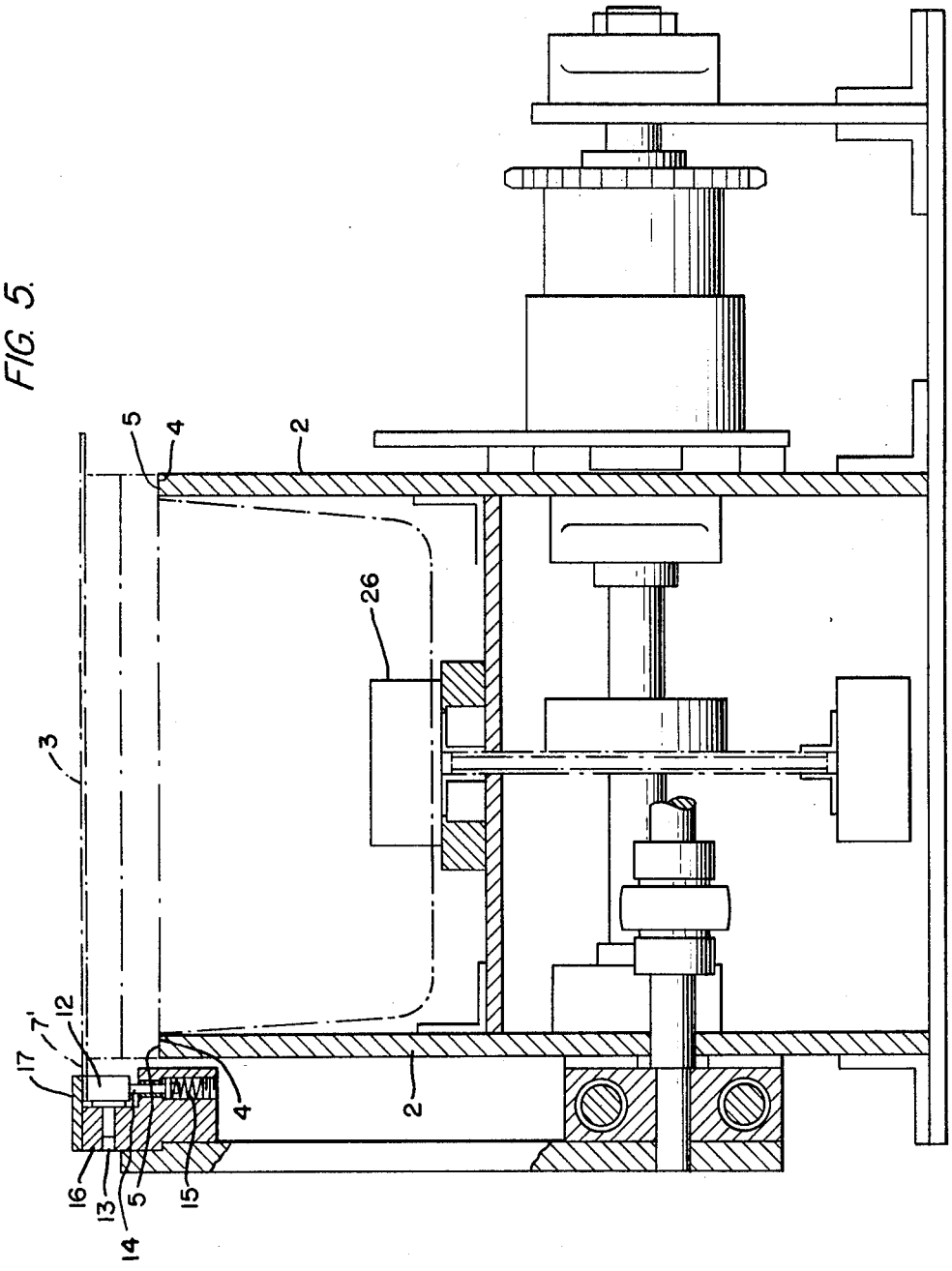

TRAY INDEXING APPARATUS

BACKGROUND AND SUMMARY OF THE INVENTION

The present invention is directed to a tray indexing apparatus and, in particular, to a tray indexing apparatus for indexing trays containing rows of containers to be filled beneath a filler head where they are filled.

One problem faced by those industries where a product is manufactured and placed in suitable containers is that of rapidly and economically filling the appropriate containers with the product.

Thus, an object of the present invention is to provide an apparatus whereby trays containing rows of containers to be filled, such as pharmaceutical vials, cosmetic jars and the like, can be processed for rapidly and economically filling the containers.

A further object of the present invention is to provide an apparatus whereby a plurality of trays of containers can be successively advanced to a position for filling the containers and then further advanced as another tray is brought into position for filling—the entire operation being automatically repeated until all trays have been so processed.

Therefore, according to the present invention, an apparatus is provided which can rapidly and economically process trays with containers to be filled by indexing them beneath a filler head where the containers are filled. In addition, with the apparatus of the present invention, a plurality of such trays of containers can be successively advanced to a position for indexing, indexed beneath the filler head where the containers are filled and then further advanced away from the filler head as another tray is brought into position for indexing and filling—the entire operation being automatically repeated until all trays have been so processed.

The above and other objects, features and advantages of the present invention will become more apparent from the description of a preferred embodiment set forth hereinafter when considered in conjunction with the accompanying drawings wherein the same reference numerals are used to designate like parts throughout the several figures.

BRIEF DESCRIPTION OF THE DRAWINGS

FIG. 1 is a view from a first side of the apparatus with the chain conveyor for advancing the trays shown in dashed lines;

FIG. 3 is a view from a second side of the apparatus showing several trays supported for movement in the apparatus;

FIG. 5 is a sectional view of the apparatus taken along the line B—B of FIG. 3 showing a tray supported in the apparatus and additional details of the indexing device and chain conveyor for advancing the trays;

DETAILED DESCRIPTION OF THE DRAWINGS

Figure 2:
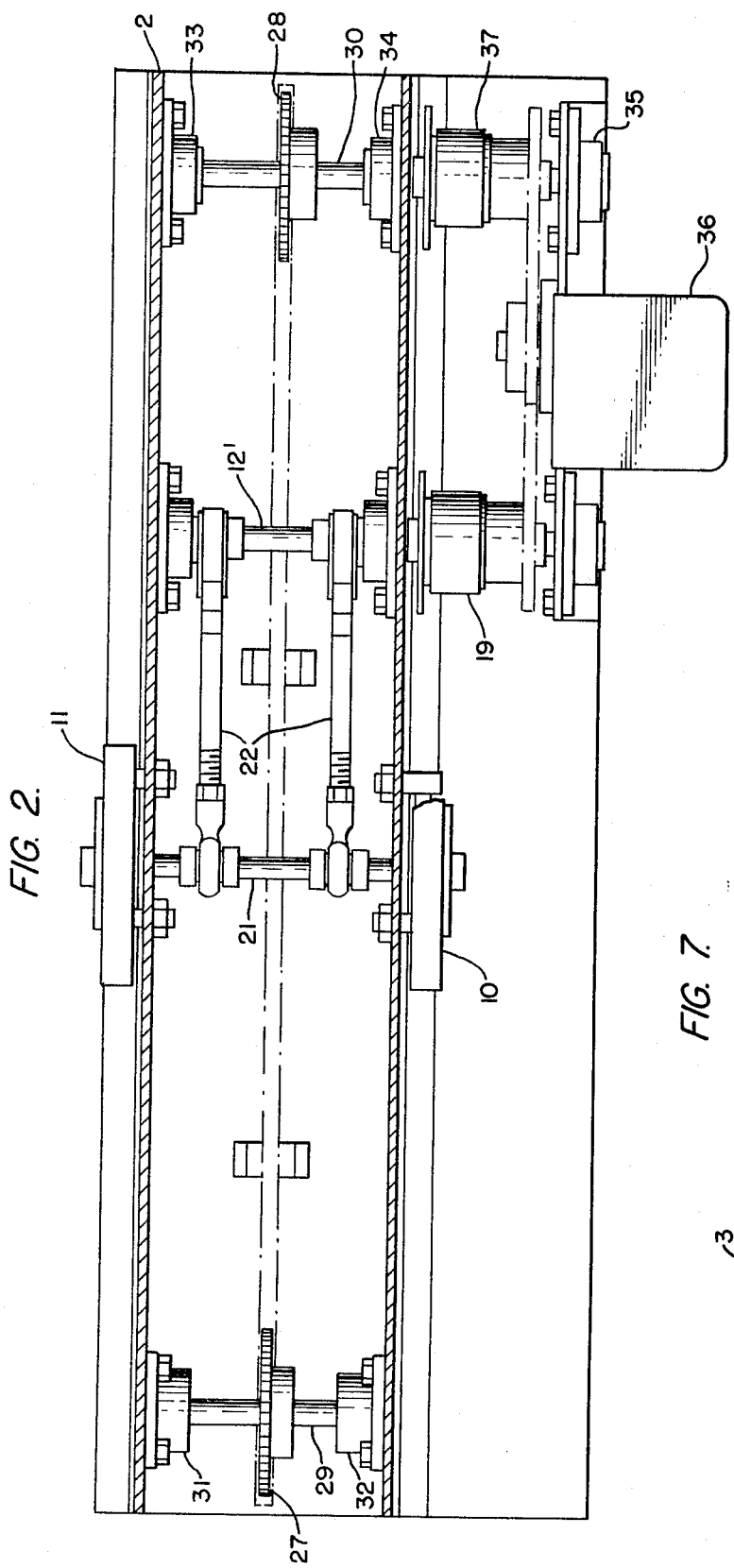
FIG. 2 is a sectional view of the apparatus taken along the line A—A in FIG. 1.

The tray indexing apparatus 1 according to a preferred embodiment illustrated in the drawings comprises a pair of horizontally or essentially horizontally extending tray support members 2 mounted on a base. The support members 2 lie in respective parallel vertical planes.

Trays 3 suitable for use with the apparatus 1 are supported for movement on the upper edges 4 of the members 2 as shown in FIGS. 3 and 5, the trays being formed with an outwardly directed flanged portion 5 for contacting the upper edges 4. The movement of the supported trays in the apparatus is along a predetermined path in the direction indicated by the arrow 6 in FIG. 3.

Figure 7:
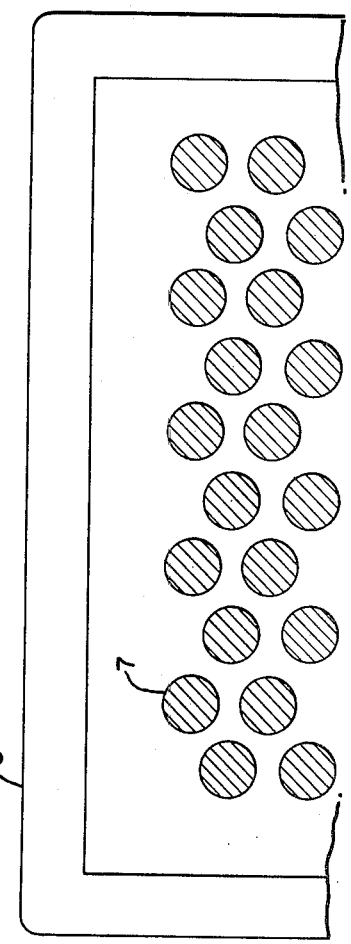
FIG. 7 is a top view of a portion of a tray used in the apparatus of the present invention schematically showing rows of containers to be filled.

Each of the trays 3 typically contains rows of containers 7 to be filled as shown schematically in FIG. 7. The trays with the containers 7 to be filled are moved along the apparatus by a chain conveyor arrangement 8 to a position where the first row or rows of containers 7 are beneath a suitable filler head 9 illustrated schematically in FIG. 3. From this position, left- and right-hand indexing assemblies 10 and 11 index or incrementally advance the trays 3 beneath the filler head 9 so that successive rows of the containers 7 can be filled. Once the last row of containers in a tray is filled, the tray is moved further along the apparatus by the chain conveyor arrangement 8 in the direction of the arrow 6 and away from the filler head 9, while another tray is advanced by the chain conveyor arrangement to the filler head for indexing by the indexing assemblies and filling of its containers.

Figure 4:
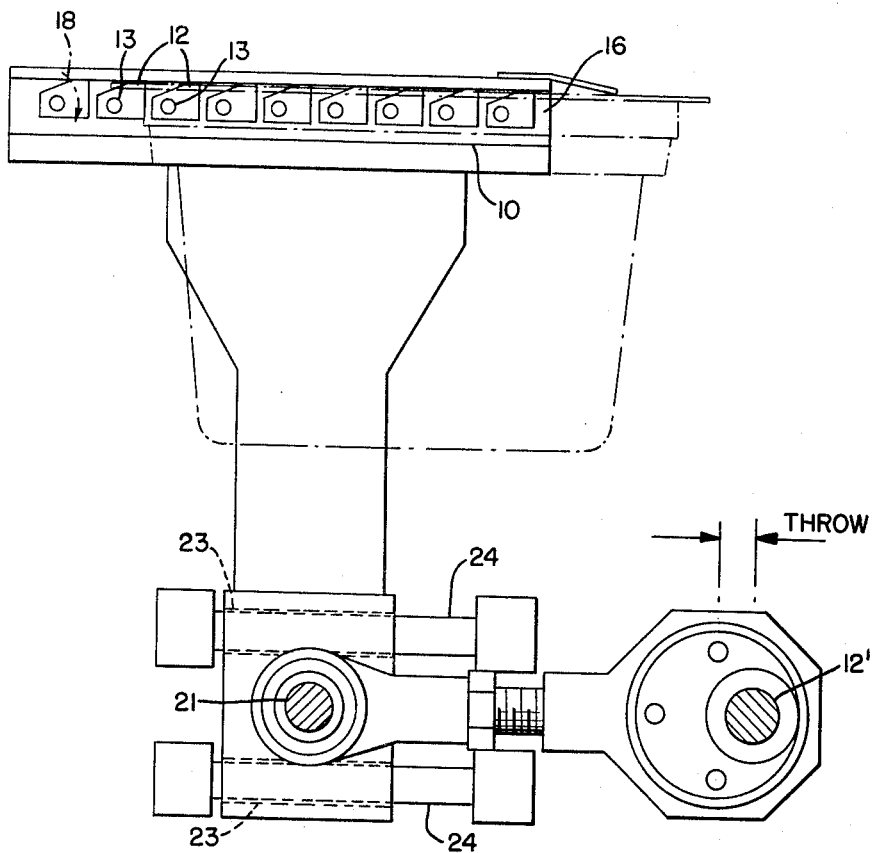
FIG. 4 is a view in detail of a device for indexing the trays and the eccentric driving arrangement for reciprocating the device.
Figure 6:
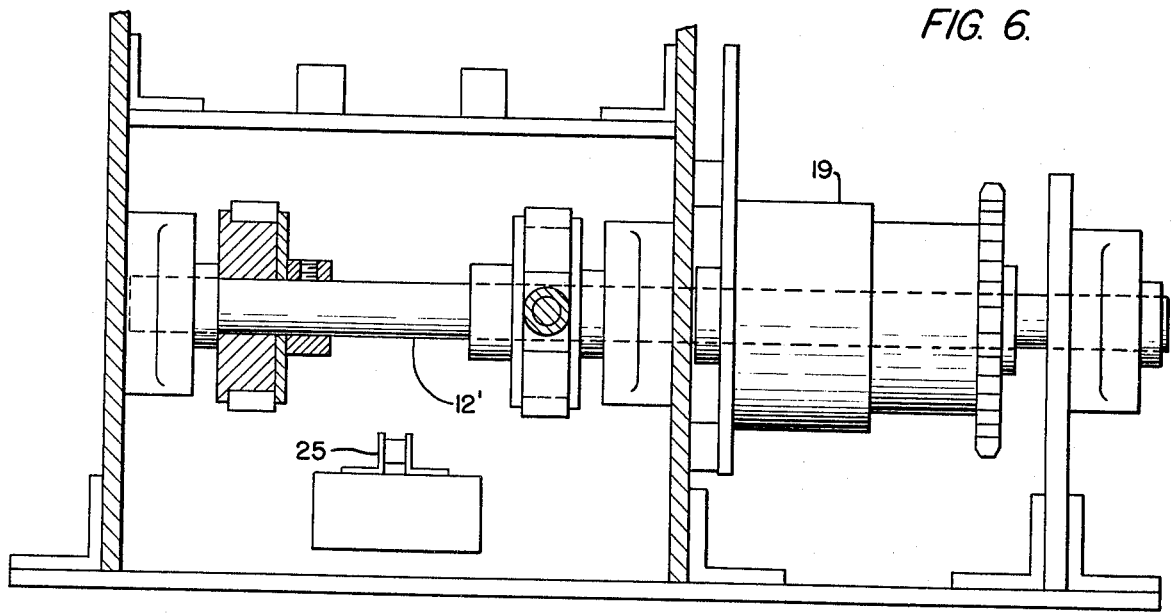
FIG. 6 is a sectional view of the apparatus taken along the line C—C of FIG. 3.

The indexing assemblies 10 and 11 both operate in the same manner and, therefore, only one of these will be described in detail. Considering the indexing assembly 10, it is noted that a plurality of pivotably mounted pushing elements 12 are provided on a support member 16 thereof as shown in FIGS. 4 and 5. Each pushing element 12 is mounted to pivot about a pin 13 secured in the member 16. The elements 12 are yieldably biased in the upper or pushing position depicted in FIG. 4 by pins 14 biased upwardly against the forward end of the elements 12 by springs 15 (see FIG. 5).

A cover member 17 is also fastened to the support member 16 of the indexing assembly 10 so as to extend inwardly therefrom over a portion of an outwardly extending upper rim portion 7' provided on each tray 3. The spacing between this cover member 17 and the pushing elements 12 is small so that the rim 7' of an approaching tray 3 will deflect the elements 12 downwardly against the bias of pins 14 and springs 15 upon passing between the cover member 17 and pushing elements 12, each element 12 pivoting or rotating clockwise as shown by arrow 18 in FIG. 4.

The trays 3 are successively advanced to a position for indexing by the indexing assemblies 10 and 11 by means of the chain conveyor arrangement 8. Once in position for indexing, the indexing assemblies 10 and 11 are reciprocated back and forth to incrementally push the supported tray beneath the filler head 9 where the rows of containers 7 therein are filled. With reciprocation of the indexing assemblies, a pusher element 12 of each assembly is moved back beyond the trailing edge of the rim 7' of the supported tray 3 where it is free to move upwardly to the pushing position shown in FIG. 4 in response to the force from its associated spring 15.

With forward movement of the indexing assemblies, these pushing elements advance the tray 3 a predetermined distance. With the next backward movement of the indexing assemblies, the next pushing element 12 of each assembly will be moved past the trailing edge of rim 7' and upwardly in pushing position to again advance the tray with the next forward movement of the indexing assemblies.

The indexing assemblies 10 and 11 are eccentrically connected to a rotatable drive shaft 12' as shown in FIGS. 1–6 for effecting the reciprocating motion of the assemblies. A clutch 19 is arranged between the rotatable drive shaft 12' and the drive from a DC electric motor 20 and reducer 36. The clutch 19 is engaged to index a tray 3 beneath the filler head 9 as discussed below.

The indexing assemblies 10 and 11 are connected by a rod 21 shown in FIG. 2 to ensure synchronous movement of the assemblies. The assemblies are also guided during reciprocation by sleeves 23 which slide over and are guided by cooperating guide rods 24. The rod 21 is eccentrically connected to the rotatable driving shaft 12' by a pair of connecting members 22 as depicted in FIG. 2.

The distance of the throw of the eccentric connection to shaft 12' is predetermined, the same being related to the spacing between the rows of containers 7 in the trays 3 so that successive rows of containers to be filled are properly positioned beneath the filler head 9 upon reciprocation of the indexing assemblies. Also, if continuous operation of the indexing assemblies is desired, the speed of rotation of the shaft 12' is set so that the speed of indexing will allow sufficient time for the successive filling of the rows of containers 7 by the filler head 9 before tray advancement occurs.

The chain conveyor arrangement 8 comprises a chain 25 which carries a plurality of tray engaging members 26 so that with movement of the chain 25, the supported trays 3 can be successively moved to a position for indexing by the indexing assemblies 10 and 11 as indexed, supported trays are moved further along the support members 2 of the apparatus 1.

The chain 25 forms a closed loop about sprockets 27 and 28 near the respective ends of the apparatus as illustrated in FIGS. 1–3. The sprockets 27 and 28 are mounted on shafts 29 and 30, respectively. The shaft 29 is supported for rotation at its ends in bearings 31 and 32. The shaft 30 is supported in bearings 33, 34 and 35. The shaft 30 is rotatably driven by the motor 20 through reducer 36 and by way of a single revolution clutch 37 with one-shot power supply.

A microswitch 38 shown schematically in FIG. 3 is provided on the apparatus 1 to sense the presence of an advancing tray 3 when the first row(s) of containers 7 to be filled in the tray are beneath the filler head 9. Actuation of the microswitch 38 by the tray 3 stops the movement of the trays 3 by the chain 25 and commences the operation of the filler head 9 for filling the first row(s) of containers in the tray. Once the filler head 9 has filled the first row or rows of containers 7 in the tray 3, the indexing assemblies 10 and 11 advance the tray so as to position the next succeeding row or rows of containers to be filled in the tray beneath the filler head. After filling of these containers, the indexing assemblies again advance the tray. A continuous filling-indexing cycle is thus repeated until all of the containers in the tray have been filled. At this point, a second microswitch 39 is actuated by the advancing of the tray to stop the indexing assemblies and commence movement again of the chain conveyor arrangement 8 so as to move the filled tray further along the support members 2 of the apparatus 1 as a tray with unfilled containers is moved into a position for filling and indexing beneath the filler head 9. This operational sequence can be continuously performed by the apparatus for as long as trays with containers to be filled are delivered to the apparatus.

In connection with the control of the indexing assemblies 10 and 11, it is noted that the clutch 19 for reciprocating these assemblies can be actuated by a signal from the filler head 9 once a row or rows of containers have been filled or can be actuated in response to closing of the microswitch 38. In this latter case, it is necessary to coordinate the relative speeds for indexing and filling of the respective rows of containers.

The single revolution clutch 37 with one-shot power supply of the chain conveyor arrangement 8 permits the trays 3 to be advanced by the chain conveyor a predetermined distance so that successive trays with containers to be filled can be accurately positioned beneath the filler head 9.

I claim:

1. A tray indexing apparatus comprising:
   means for supporting at least one tray for movement along a predetermined path;
   means for moving a supported tray along said predetermined path;
   means for stopping movement of said means for moving when said supported tray reaches a first position along said predetermined path;
   means for indexing said supported tray along the predetermined path from said first position to a second position; and
   means for stopping said indexing means and commencing movement of said means for moving when said supported tray reaches said second position whereby said supported tray is advanced along said predetermined path from said second position, wherein said means for indexing includes reciprocating pusher means for incrementally pushing a supported tray to index the same along the predetermined path from said first position to said second position, said pusher means being eccentrically connected to a rotatable driving means for effecting reciprocation of said pusher means, and wherein said reciprocating pusher means comprises a plurality of pivotably mounted pushing elements yieldably biased in a pushing position and arranged in a direction along said predetermined path so as to successively engage the trailing edge of a rim of a supported tray to push the tray and incrementally advance the same along the predetermined path with reciprocation of the pusher means, and wherein said reciprocating pusher means includes a cover member which extends over a portion of the rim of said tray to retain said tray in a position for engagement by said pushing elements.

2. The apparatus according to claim 1, wherein said means for stopping movement of the means for moving comprises a microswitch which is actuated by said tray when the tray is moved into said first position.

3. The apparatus according to claim 2, wherein said means for stopping the indexing means and commencing movement of the means for moving comprises a microswitch which is actuated by said tray when the tray is moved into said second position.

4. The apparatus according to claim 3, wherein said means for moving comprises a movable chain means with at least one tray engaging member carried thereby for contacting a supported tray and moving the same with movement of said chain means.

5. The apparatus according to claim 4, wherein the movement of said chain means is stopped by actuation of said microswitch when the tray is moved into said position and wherein said means for moving further comprises a single revolution clutch means which is drivingly associated with said movable chain means for incrementally moving the chain means and thereby a supported tray.

6. The apparatus according to claim 5, wherein a plurality of spaced tray engaging members are carried by said movable chain means so that with movement of the chain means, a plurality of supported trays can be successively moved to said first position for indexing by said indexing means as indexed, supported trays are moved further along said predetermined path from said second position.

* * * * *